(12) United States Patent
Prouzet et al.

(10) Patent No.: US 12,506,384 B2
(45) Date of Patent: Dec. 23, 2025

(54) ELECTRIC MOTOR SYSTEM

(71) Applicant: Ratier-Figeac SAS, Figeac (FR)

(72) Inventors: Bertrand Prouzet, Figeac (FR); Cedric Antraygue, Figeac (FR); Florent Palouzier, Fons (FR)

(73) Assignee: RATIER-FIGEAC SAS, Figeac (FR)

( * ) Notice: Subject to any disclaimer, the term of this patent is extended or adjusted under 35 U.S.C. 154(b) by 144 days.

(21) Appl. No.: 18/471,625

(22) Filed: Sep. 21, 2023

(65) Prior Publication Data

US 2024/0106300 A1    Mar. 28, 2024

(30) Foreign Application Priority Data

Sep. 28, 2022  (EP) ..................................... 22306436

(51) Int. Cl.
  *H02K 7/116*   (2006.01)
  *H02K 11/21*   (2016.01)
  *H02K 11/33*   (2016.01)
(52) U.S. Cl.
  CPC ............. *H02K 7/116* (2013.01); *H02K 11/21* (2016.01); *H02K 11/33* (2016.01)
(58) Field of Classification Search
  CPC ........ H02K 7/116; H02K 11/21; H02K 11/33; H02K 29/00; F16H 1/20; F16H 49/001
  USPC ............................................ 318/3, 9, 11, 12
  See application file for complete search history.

(56) References Cited

U.S. PATENT DOCUMENTS

| | | | |
|---|---|---|---|
| 7,304,450 B2 | 12/2007 | Prudham | |
| 8,878,470 B2 * | 11/2014 | Camilleri | H02K 11/33 318/722 |
| 10,312,841 B2 * | 6/2019 | Kitano | A61M 60/279 |
| 10,848,089 B2 * | 11/2020 | Hano | F02D 15/02 |
| 11,235,477 B2 * | 2/2022 | Cui | B25J 9/102 |
| 2009/0039725 A1 | 2/2009 | Kanatani et al. | |
| 2017/0184190 A1 | 6/2017 | Klassen | |

(Continued)

FOREIGN PATENT DOCUMENTS

| | | |
|---|---|---|
| CN | 217467432 U | 9/2022 |
| DE | 3336669 A1 | 4/1985 |

OTHER PUBLICATIONS

Abstract for CN217467432 (U), Published: Sep. 20, 2022, 1 page.

(Continued)

*Primary Examiner* — David Luo
(74) *Attorney, Agent, or Firm* — CANTOR COLBURN LLP

(57) ABSTRACT

A motor system includes a brushless motor with a stator, a rotor having a first number of rotor poles, and a motor shaft connected to the rotor. The motor system also includes control electronics configured to control a brushless motor that has a second, number of rotor poles, different from the first number of rotor poles. The second number of rotor poles is an integer multiple, N, of the first number of rotor poles. A position sensor is communicatively connected to the control electronics. A first gear is mounted on the motor shaft and connected for rotation with the motor shaft, the first gear having a first number of teeth. A second gear is engaged with the first gear, the second gear having a second number of gear teeth. The position sensor is configured to detect an angular position of the second gear and provide it to the control electronics.

15 Claims, 10 Drawing Sheets

(56) References Cited

U.S. PATENT DOCUMENTS

2021/0066999 A1   3/2021   Taupeau et al.

OTHER PUBLICATIONS

Abstract for DE3336669 (A1), Published: Apr. 18, 1985, 1 page.
European Search Report for Application No. 22306436.1, mailed Mar. 28, 2023, 9 pages.

* cited by examiner

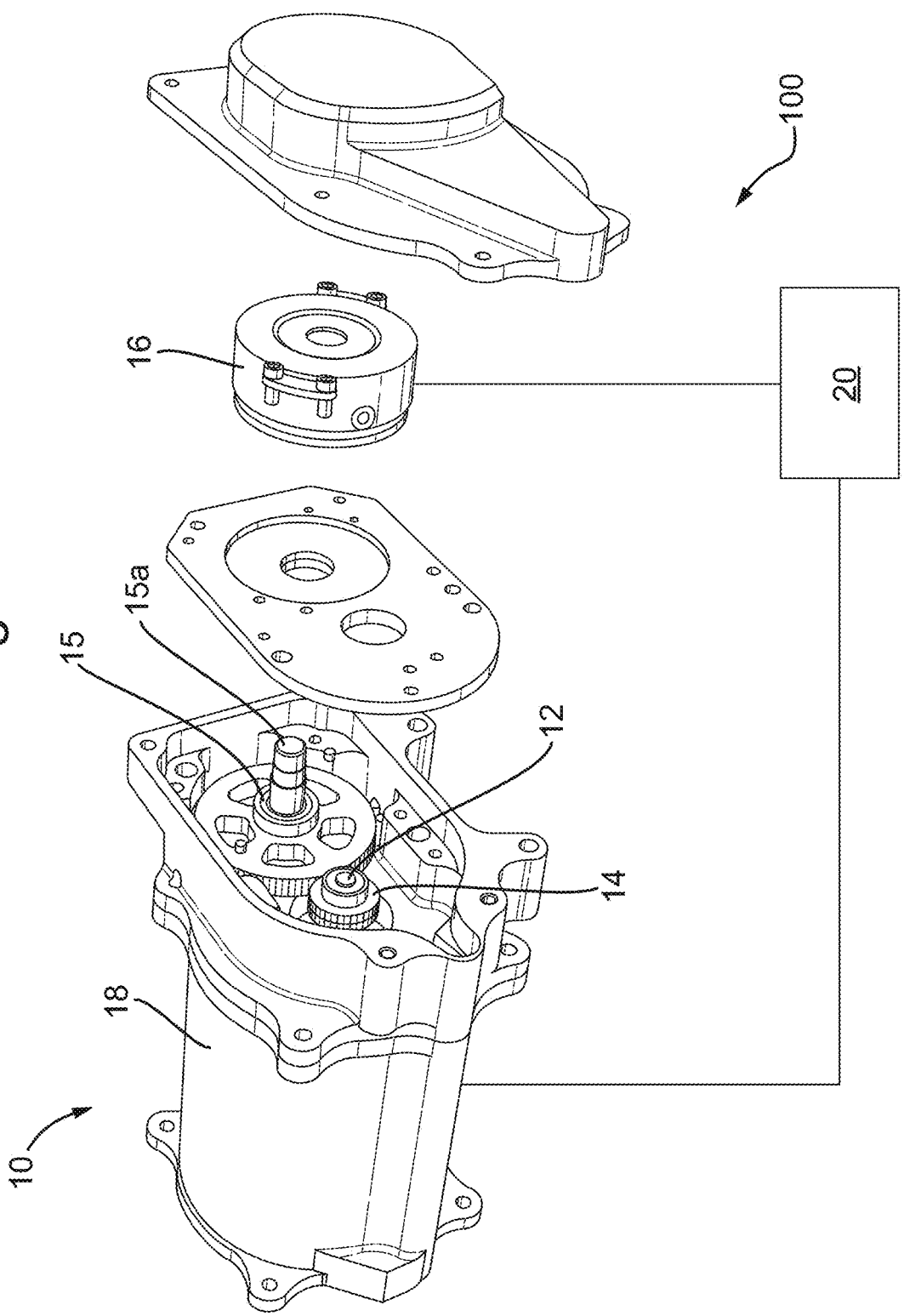

ELECTRIC MOTOR SYSTEM

CROSS REFERENCE TO RELATED APPLICATION

This application claims priority to European Patent Application No. 22306436.1 filed Sep. 28, 2022, the entire contents of which is incorporated herein by reference.

TECHNICAL FIELD

The present disclosure relates to an electric motor system, and a method of controlling an electric motor.

BACKGROUND

Electronic motors are widely used in aerospace applications, for example to control flaps, slats, brakes and many other components. Most aerospace components are subject to a complex certification process before they are approved for use. The certification process can cost millions of euros and so it can be a considerable cost saving to find further uses for already-certified parts, where the further use does not impact the certification.

SUMMARY

According to a first aspect, there is provided a motor system comprising: a brushless motor. The brushless motor comprises: a stator; a rotor having a first number, p, of rotor poles; and a motor shaft connected to the rotor. The motor system further comprises a reducer arrangement comprising: a reducer input connected for rotation with the motor shaft; and a reducer output connected to the reducer input and arranged such that a single full rotation of the reducer input causes a 1/N rotation of the reducer output, where N is an integer greater than one. The motor system further comprises: a position sensor configured to detect an angular position of the reducer output and to provide the detected angular position to a control electronics; wherein the control electronics is connected to the motor and is arranged to control the motor based on the detected angular position, wherein the control electronics is configured for controlling a motor having p×N rotor poles.

The reducer arrangement therefore allows the motor to be controlled using control electronics, without modification, that were originally designed to control a motor having a different number of poles. Specifically, the reducer arrangement allows the system to properly control a motor having p poles, using control electronics that are configured to control a motor having p×N poles. This allows the use of a motor having a desired number of poles while avoiding the need to modify and recertify the control electronics or to design new control electronics specifically for that motor that would require its own certification.

The reducer arrangement may be implemented in a number of different ways, as discussed below.

In one form, the reducer input may be a first gear having a first number of gear teeth, and the reducer output may be a second gear having a second, different, number of gear teeth; wherein the second number of gear teeth is N-times the first number of gear teeth.

The reducer arrangement may further comprise a free gear mounted axially-adjacent to and coaxial with one of the first gear and the second gear, wherein the free gear engages the other of the first gear and the second gear but in the opposite direction as compared to the gear to which it it is mounted. This is due to the reducer arrangement comprising an elastic element which is provided to bias the free gear such that teeth of the free gear are angularly offset from the teeth of its axially-adjacent gear.

The elastic element and free gear thereby together take up backlash that exists between the first and second gears. This ensures that the reducer output starts to turn immediately when the motor (and reducer input) begin to turn in either direction of rotation. This can ensure that the control electronics receives information allowing proper control of the motor, i.e. so that control signals sent by the control electronics to the motor are properly synchronised with the actual position of the rotor within the motor.

The elastic element may be a torsion spring, however, other alternative elastic elements may be used.

Alternatively, the reducer arrangement may be a strain wave gear system, wherein reducer input is a wave generator of the strain wave gear system and wherein the reducer output is a flex spline of the strain wave gear system.

Alternatively, the reducer arrangement may comprise a first wheel, a second wheel, and a timing belt looping around both the first wheel and the second wheel; wherein the reducer input is the first wheel, and wherein the reducer output is the second wheel; wherein the first wheel has a first circumference, wherein the second wheel has a second, different circumference; and wherein the second circumference is N-times larger than the first circumference.

A timing belt is a belt in the form of a loop having protrusions or teeth on an inner surface of the loop. The protrusions/teeth may engage with teeth on the first and second wheels, such that rotation of the first wheel urges the belt to move, via engagement of the teeth on the first wheel with the teeth/protrusions on the belt, and, similarly, the belt turns the second wheel by the belt's protrusions/teeth urging against the teeth of the second wheel. This arrangement allows the first and second wheels to be spaced apart from one another.

According to a second aspect, there is provided a motor system comprising: a brushless motor. The brushless motor comprises: a stator; and a rotor having a first number, p, of rotor poles; and a motor shaft connected to the rotor. The system further comprises a multiplier arrangement comprising: a multiplier input connected for rotation with the motor shaft; and a multiplier output connected to the multiplier input and arranged such that a single full rotation of the multiplier input causes M full rotations of the multiplier output, where M is an integer greater than one. The motor system further comprising: a position sensor configured to detect an angular position of the multiplier output and to provide the detected angular position to a control electronics; wherein the control electronics is connected to the motor and is arranged to control the motor based on the detected angular position, wherein the control electronics is configured for controlling a motor having p/M rotor poles, wherein p is an integer multiple of M.

The reader will appreciate that the motor system of the second aspect is conceptually very similar to the first aspect. In the first aspect, the reducer arrangement allows the motor to be controlled by control electronics originally designed to control a motor having more poles than the motor that the control electronics is now connected to. In the second aspect, the multiplier arrangement allows the motor to be controlled by control electronics originally designed to control a motor having fewer poles than the motor that the control electronics is now connected to.

Similar to the reducer arrangement, the multiplier arrangement may be implemented in a number of different ways.

In one form, the multiplier input may be a first gear having a first number of gear teeth, and the multiplier output is a second gear having a second, different, number of gear teeth; wherein the first number of gear teeth is N-times the second number of gear teeth.

A free gear may be mounted axially-adjacent to and coaxial with one of the first gear and the second gear, such that the free gear engages the other of the first gear and the second gear. This engagement occurs in the opposite direction as compared to the gear on which it is mounted. This is due to an elastic element being provided to bias the free gear such that the teeth of the free gear are angularly offset from the teeth of its axially-adjacent gear.

Alternatively, the multiplier arrangement may comprise a first wheel, a second wheel, and a timing belt looping around both the first wheel and the second wheel; wherein the first wheel has a first circumference, wherein the second wheel has a second, different circumference; and wherein the first circumference is N-times larger than the second circumference.

The position sensor may be one of: a resolver, a Hall effect sensor, a potentiometer, optical encoder, encoder, or an inductive sensor.

The multiplier arrangement may alternatively be a strain wave gear system, wherein the multiplier output is a wave generator of the strain wave gear system and wherein the multiplier input is a flex spline of the strain wave gear system.

According to a third aspect, there is provided a method of controlling a brushless motor, the method comprising: providing a brushless motor that comprises: a stator; a rotor having a first number, p, of rotor poles; and a motor shaft connected to the rotor; and a reducer arrangement having a reducer input and a reducer output, wherein the reducer input is connected for rotation with the motor shaft; and the reducer output is connected to the reducer input and arranged such that a single full rotation of the reducer input causes a 1/N rotation of the reducer output, where N is an integer greater than one. The method further comprises: connecting control electronics to the motor, wherein the control electronics are configured to control a motor having N×p rotor poles; detecting, using a position sensor, an angular position of the reducer output; providing the detected angular position to the control electronics; and controlling the brushless motor using the control electronics based on the detected angular position.

As is described above in relation to the first aspect, the reducer input may be a first gear having a first number of gear teeth, and the reducer output may be a second gear having a second, different, number of gear teeth; wherein the second number of gear teeth is N-times the first number of gear teeth. The method may then further comprise: mounting a free gear axially-adjacent to and coaxial with one of the first gear and the second gear, such that the free gear engages the other of the first gear and the second gear but in the opposite direction to the gear it is mounted on thanks to an elastic element which is provided to bias the free gear such that teeth of the free gear are angularly offset from teeth of its axially-adjacent gear.

According to a fourth aspect, there is provided a method of controlling a brushless motor, the method comprising: providing a brushless motor that comprises: a stator; a rotor having a first number, p, of rotor poles; and a motor shaft connected to the rotor; and a multiplier arrangement having a multiplier input and a multiplier output, wherein the multiplier input is connected for rotation with the motor shaft; and the multiplier output is connected to the multiplier input and arranged such that a single full rotation of the multiplier input causes a M full rotations of the multiplier output, where M is an integer greater than one. The method then comprises: connecting control electronics to the motor, wherein the control electronics are configured to control a motor having p/M rotor poles, where p is an integer multiple of M; detecting, using a position sensor, an angular position of the reducer output; providing the detected angular position to the control electronics; and controlling the brushless motor using the control electronics based on the detected angular position.

The multiplier arrangement may be implemented in a number of different ways.

As described above in relation to the second aspect, in one form, the multiplier input may be a first gear having a first number of gear teeth, and the multiplier output is a second gear having a second, different, number of gear teeth; wherein the first number of gear teeth is N-times the second number of gear teeth.

A free gear may be mounted axially-adjacent to and coaxial with one of the first gear and the second gear, such that the free gear engages the other of the first gear and the second gear. This engagement occurs in the opposite direction as compared to the gear on which it is mounted. This is due to an elastic element being provided to bias the free gear such that the teeth of the free gear are angularly offset from the teeth of its axially-adjacent gear.

Alternatively, the multiplier arrangement may comprise a first wheel, a second wheel, and a timing belt looping around both the first wheel and the second wheel; wherein the first wheel has a first circumference, wherein the second wheel has a second, different circumference; and wherein the first circumference is N-times larger than the second circumference.

Alternatively, the multiplier arrangement may be a strain wave gear system, wherein multiplier output is a wave generator of the strain wave gear system and wherein the multiplier input is a flex spline of the strain wave gear system.

BRIEF DESCRIPTION OF THE DRAWINGS

Certain embodiments of the present disclosure will now be described in greater detail by way of example only and with reference to the accompanying drawings in which:

FIG. 1 shows an exploded view of a motor system;

DETAILED DESCRIPTION

Figure 2A:
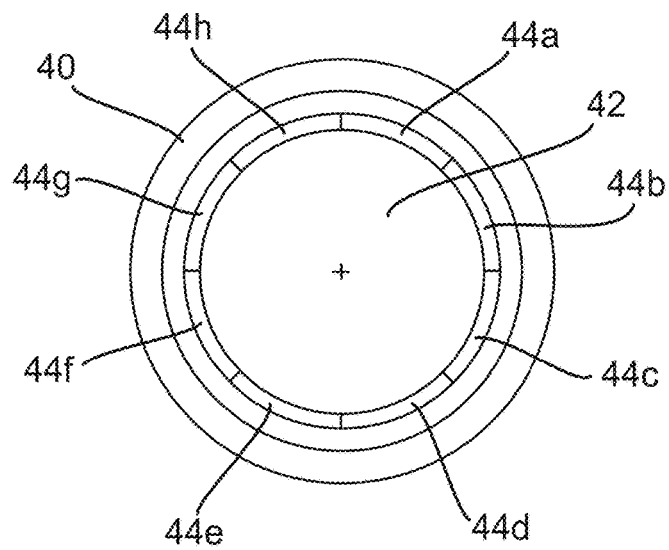
FIG. 2A shows a cross-sectional view of the rotor and stator of the motor.

FIG. 1 shows a motor system 100 that comprises a brushless electrical motor 10 and control electronics 20. The electrical motor 10 may be for use in aeronautical applications, such as for controlling the positions of flaps or slats on an aircraft. A motor shaft 12 is connected to a rotor of the motor 10. The motor shaft 12 defines a shaft axis. The motor shaft 12 may connect to other components to drive them in rotation, such as a screw shaft for a screw actuator (not shown).

A first wheel 14 is mounted on the motor shaft 12, and the first wheel 14 engages with a second wheel 15 located off the shaft axis. The first 14 and second 15 wheels together form a reducer arrangement.

In the example shown in FIG. 1, the first wheel 14 is a first gear and the second wheel 15 is a second gear. The first and second gears 14,15 have inter-engaging gear teeth. In an alternative, and with brief reference to FIG. 6, the first and second wheels 14',15' may be two wheels connected by a timing belt 24 having teeth or protrusions thereon that engage with corresponding teeth on the first and second wheels 14',15'.

Returning to FIG. 1, the second gear 15 has a gear shaft 15a. A position sensor 16 monitors the angular position of the gear shaft 15a. In an alternative, not shown, the position sensor 16 can monitor the passing of teeth of the second gear 15 to determine the angular position of the second gear 15, rather than monitoring the gear shaft 15a.

The motor 10, reducer arrangement, and position sensor 16 are contained within a housing 18. The position sensor 16 is mounted such that it is fixed relative to the housing 18 and, during operation, the gear shaft 15a rotates within the position sensor 16.

The reducer arrangement formed by the first 14 and second gears 15, is arranged such that the second gear 15 rotates 1/N rotations for every full rotation of the first gear 14. Put another way, the first gear 14 (and therefore the rotor) must complete N full rotations in order to effect a single complete rotation of the second gear 15. The gear ratio, N, is defined as:

$$N = (\text{number of teeth of second gear } \mathbf{15})/(\text{number of teeth of first gear } \mathbf{14}),$$

where N is an integer greater than one.

The motor 10 is controlled by the control electronics 20, and the operation of the control electronics 20 will be described in detail later.

FIG. 2A shows a schematic cross-section of the internal parts of the motor 10, including a rotor 42 and a stator 40. The motor 10 is a brushless electric motor having a number, p, of poles. In the example shown, eight magnets 44a-h are arranged circumferentially around the rotor. Each magnet 44a-h is referred to in the art as a "pole" and a motor 10 having eight magnets 44a-h arranged on the rotor 42 is referred to as an "eight pole motor", i.e. p=8. The present disclosure is not limited to eight poles in the rotor, and the rotor may have any suitable number of poles. The stator 40 has a number of electromagnets facing the magnets 44a-h of the rotor 42. To drive rotation of the rotor, the electromagnets of the stator 40 are powered on/off in a particular sequence. This is typically in the form of providing a sinusoidal voltage signal to each electromagnet to control the magnetic field produced thereby. The sinusoidal signal sent to a given electromagnet is typically offset by a phase angle from the sinusoidal signal sent to the next adjacent electromagnet. The sequence of powering on/off of the electromagnets is controlled by the control electronics 20.

Figure 2B:
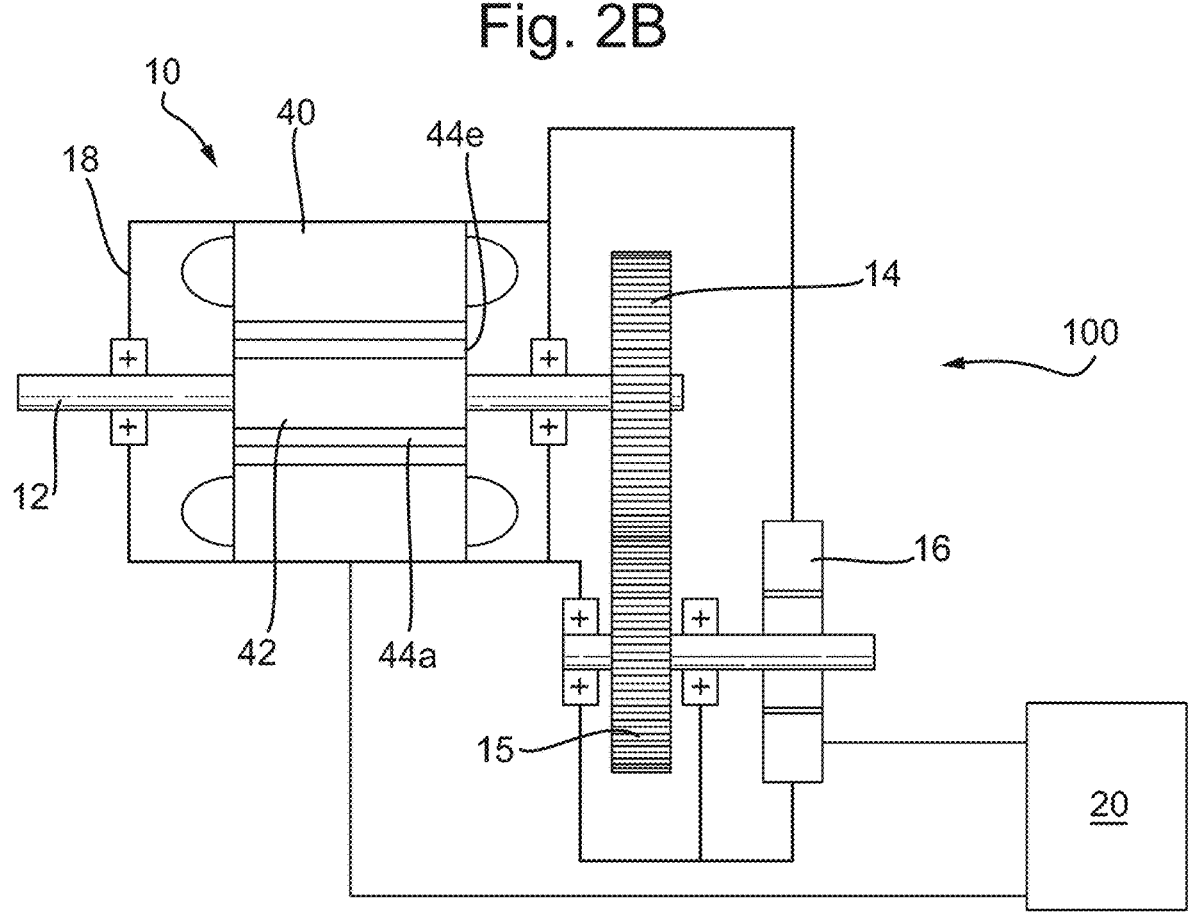
FIG. 2B shows a cross-sectional view of the motor system.

FIG. 2B shows a schematic cross-section of the motor system 100. As before, the control electronics 20 are connected to the position sensor 16 and receive position information therefrom. The control electronics 20 are also connected to the motor 10 supplies and controls power to the stator 40. In FIG. 2B, the motor shaft 12 extends out of the housing 18 on a side away from the first and second gears 14,15 and the position sensor 16. In an alternative (not shown), the motor shaft 12 may be contained within the housing 18 on that side. Similarly, gear shaft 15a that extends into the position sensor 16 may (as shown in FIG. 2B) extend through the position sensor 16. In an alternative (not shown), the gear shaft 15a may terminate inside the position sensor 16.

Typically control electronics for a brushless electric motor are designed expressly for controlling the number of poles of that particular motor. That is, in a typical arrangement, the motor may be an eight pole motor and this will be controlled by control electronics that is designed for an eight pole motor. To allow the control electronics to operate a brushless motor, it is typical to provide a position sensor that measures the angle of the rotor within the stator and the position information is provided to the control electronics. The control electronics then use this position information to power the proper coil winding (called hereafter "phase") to achieve to the required motor behavior.

It can be expensive to obtain safety certification for control electronics. This is particularly so for control electronics used in aeronautical or aerospace applications, where certification costs can run into the millions of euros. The present motor system 100 is a system in which the control electronics was originally designed to control a particular reference motor and was duly certified, and where the control electronics 20 is now being reused, without modification (because such modification may affect the validity of the certification) to control a different motor (i.e. motor 10) that has a different number of poles from the reference motor.

Therefore, the control electronics 20 is configured to control a motor having a second different number of poles from number of poles of the motor 10 of FIG. 1.

Put another way, the motor 10 may have a first number of poles (e.g. eight poles 44a-h as shown in FIG. 2), and the control electronics 20 is configured to control a motor having a second number of poles, different from the first number of poles. For example, the control electronics 20 may be configured to control a brushless electric motor having thirty-two poles.

A ratio is defined as the ratio between the second number of poles and the first number of poles. The ratio is called N and this is the same "N" as used in relation to the reducer arraignment, discussed above. That is:

$$N = (\text{number of poles of original motor})/(\text{number of poles of motor } 10)$$

As before, N is an integer greater than one.

Put another way, the number of poles of the original motor (i.e. the motor that the control electronics 20 was originally configured to control)=N×p This means that the control electronics 20 is configured to control a brushless electric motor having a greater number of poles than the number of poles in the motor 10 of FIG. 1.

Further, the control electronics 20 is configured to control a brushless electric motor that has an integer-multiple, N, of the number, p, of poles of the motor 10.

In the example discussed above, the control electronics 20 may be configured to control a 32-pole motor, while the motor 10 may be an 8-pole motor. In this example, N=4. Following this example further, the reducer arrangement is arranged such that four full rotations of the motor shaft 12, and therefore four full turns of the first gear 14, results in a single full rotation of the second gear 15, and consequently the position sensor 16 has measured a single full rotation.

The position sensor 16 is in communication with the control electronics 20. The position sensor 16 may communicate via a wired connection or a wireless connection with the control electronics 20. The position sensor 16 provides information to the control electronics 20. The control electronics 20 sends electrical power to the electromagnets of the motor 10 in a precise timing sequence to cause rotation of the rotor within the stator. To do this, the control electronics requires information on the current angular position of the rotor within the stator and, typically, this information is provided by a position sensor. The position sensor 16 may be a resolver, a Hall effect sensor, a potentiometer, optical encoder, encoder, or an inductive sensor, for example.

However, due to the gears 14,15, the control electronics 20 will receive information indicating that a single rotation of the rotor has occurred when the rotor 12 has in fact rotated N-times. The fact that the position sensor 16 does not directly measure rotation of the motor shaft 12, but instead measures rotation after the reducer arrangement, means that the position sensor output "deceives" the control electronics 20. This allows the control electronics 20 to function in its originally designed manner (e.g. for controlling a 32-pole motor) while actually being connected to and controlling a motor 10 having fewer poles (e.g. an 8-pole motor). Therefore, the gears 14,15 and the position sensor data provided by the position sensor 16 allow the control electronics 20 to control a different design of motor (i.e. motor 10) than the reference motor that the control electronics was originally designed to control. The control electronics 20 does not require any modification in order to control the motor 10. In particular, it does not require any modification that might invalidate its certification.

As a result of N being an integer greater than one, the rotor has always completed multiple full rotations when the control electronics "thinks" (based on the received position data) that the rotor has rotated once. This means the control electronics 20 will be in the correct synchronisation with the motor 10 and will be powering the correct electromagnet of the motor 10 with the correct timing (i.e. when the rotor is in the correct position relative to that electromagnet) to properly drive rotation of the rotor in the motor 10.

To ensure the motor 10 can be operated in both directions, i.e. clockwise and anticlockwise rotation of the motor shaft 12, the backlash between first gear 14 and second gear 15 should be kept as small as possible.

Figure 5:
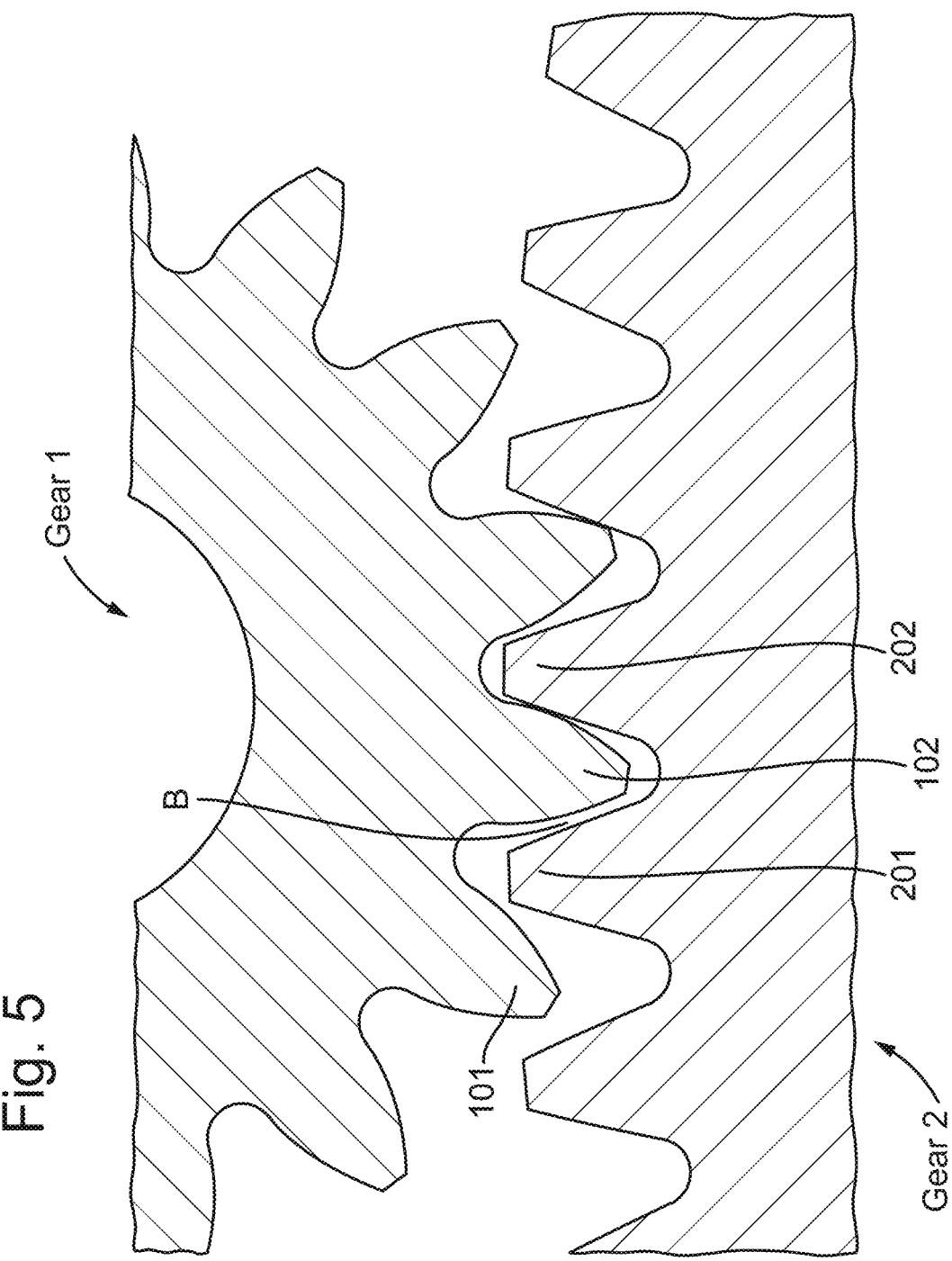
FIG. 5 shows interlinked gears having backlash.

In addition to this, it may alternatively, or also, be beneficial to minimize the impact of backlash for applications where there is only one direction of rotation used. For example, during assembly of the unit, the position sensor setting must be adjusted. If this is done with gear 15 gently biased against 14 in the right direction, then the position sensor reading will be accurate during operation. To see why, consider FIG. 5 which shows two gears, Gear1 and Gear2, having a large amount of backlash B between the two gears. Two adjacent teeth 101,102 of Gear1 are labelled and two adjacent teeth 201,202 of Gear2 are labelled. In the orientation shown, Gear2 has been rotating counter-clockwise and, as such, a second tooth 202 of Gear2 is abutting against a second tooth 102 of Gear1 so as to drive Gear1 in a clockwise direction. If Gear2 then changes direction of rotation, it must first rotate by an angular amount to take up the backlash B before the first tooth 201 of Gear2 comes into contact with the second tooth 102 of Gear1. After the backlash B has been taken up, Gear1 begins to turn in the opposite direction under the driving force from Gear2.

If Gear1 is equivalent to the second gear 15 and Gear2 is equivalent to the first gear 14, (i.e. if there is large backlash between the gears 14 and 15 of the present system 100) this means that when the motor 10 reverses direction, the first gear 14 must rotate by a distance in this new direction before the first gear 14 starts to move the second gear 15. Therefore, the first gear 14 can move a large distance before the reverse movement of the motor shaft 12 gets detected via the position sensor 16 and then fed back to the control electronics 20. This may lead to the timing of the control electronics 20 being out of sync compared to the actual position of the rotor within the stator and may cause the motor to malfunction.

Thus, keeping the backlash as small as possible helps ensure the motor 10 can be properly operated in both rotational-directions by the control electronics 20. Although it may be less critical for a multiplier arrangement, this method for reducing the backlash may also beneficially be used in arrangements having a multiplier. In the example mentioned above, regarding minimizing backlash during assembly, for implementations where the motor 10 will be entirely or primarily operated in a single direction of rotation, the second gear 15 may be gently biased against that direction of rotation and then the position sensor is set in this condition.

One way to achieve this is to lock the second gear 15 and apply torque from the motor, to take up the backlash by bringing the first gear 14 into abutment (in that direction of rotation) with the second gear 15. This ensures that a given tooth on the second gear 15 rests against a given tooth on the first gear 14, such that when the first gear 14 moves in the direction of rotation, this rotation is immediately transmitted (i.e. without backlash) to the second gear 15. In this way, during assembly, the gears can be biased and pressed against each other in the correct direction, such that the position sensor may be accurately set when in this position.

Another arrangement is provided to ensure the motor 10 can be operated in both rotational-directions by the control electronics 20.

Figure 3:
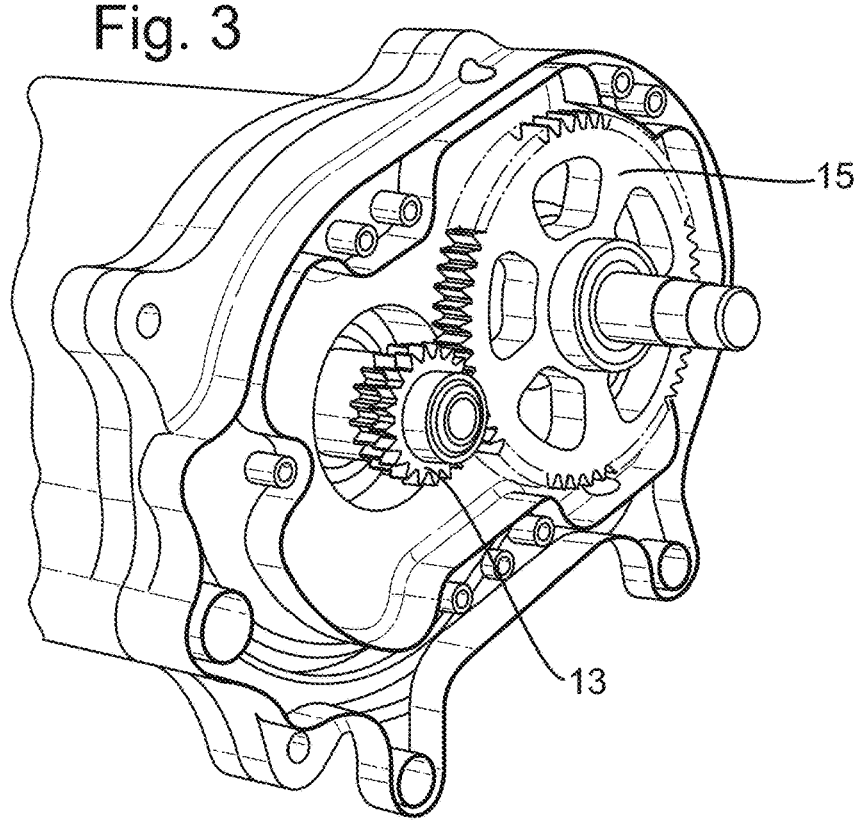
FIG. 3 shows a view of a first gear arrangement of the motor.
Figure 4:
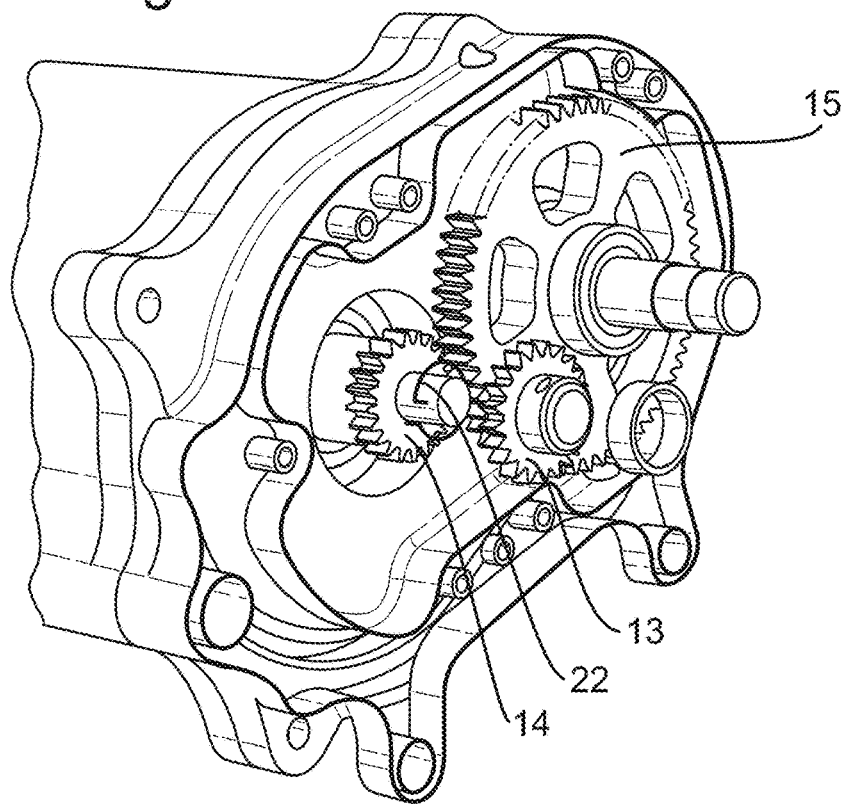
FIG. 4 shows a view of a second gear arrangement of the motor.

In this alternative, shown in FIGS. 3 and 4, there are two gears mounted on the motor shaft 12: the aforementioned first gear 14, and a free gear 13. The first gear 14 is fixed for rotation with the motor shaft 12, as before. The first gear 14 and free gear 13 have equal size and equal numbers of teeth, and both of them engage with the second gear 15. The free gear 13 is free to rotate relative to the motor shaft 12. The free gear 13 is connected to the first gear 14 or with the motor shaft 12 by an elastic element 22. The elastic element 22 may, for example, be a torsion spring, such as a steel torsion spring or plastic torsion spring.

The elastic element 22 is arranged to bias the free gear 13 at an angular position relative to the first gear 14, such that there is a small angular offset between the teeth of the first gear 14 and the teeth of the free gear 13 and so that, when a tooth of the first gear 14 is in abutment with a given tooth of the second gear 15, a tooth of the free gear 13 is in abutment with the next adjacent tooth of the second gear 15, i.e. abuts the tooth immediately next to the given tooth. That is, the elastic element 22 preloads both the free gear 13 and the first gear 14 against respective teeth of the second gear 15. This free gear biasing can also be used to contact the teeth of the free gear 13 against the teeth of the first gear 14 and second gear 15 on the other side.

When the motor 10 is turning in a first direction such that teeth of the first gear 14 are loading against teeth of the second gear 15, the free gear 13 has no effect, i.e. the teeth of the free gear 13 do not abut against teeth of the second gear 15 so as to drive the second gear 15.

When the motor 10 changes direction of rotation, the teeth of the free gear 13 (which are already in abutment with teeth of the second gear, as explained above) will immediately load against the teeth of the second gear 15, such that the free gear 13 is driving the second gear 15 for rotation. The force from the motor 10 turns the first gear 14, and this force is transmitted via the elastic element 22 to the free gear 13, such that the free gear 13 drives the second gear 15. The elastic element 22 is sufficiently preloaded so as to prevent the free gear 13 rotation relative to the first gear 14 when it is being subjected to motor torque. The preload should be sufficient to ensure the second gear 15 starts turning essentially immediately when the force driving the second gear 15 comes via the free gear 13. That is, there will be some friction in the second gear 15 and/or in the position sensor 16 and there will be some inertia in the second gear 15 and the position sensor 16, and these resist rotation of the second gear 15. The elastic element 22 should have a sufficiently high preload to overcome this friction and inertia without experiencing significant deformation when the motor shaft 12 is rotating. That is, the angular offset between the first gear 14 and free gear 13 should be substantially constant in both directions of rotation of the motor shaft 12.

The elastic element 22 must have some elasticity (i.e. must not be overly stiff), so as to prevent the gears 14,13,15 from jamming. A low enough spring stiffness allows to maintain a high enough preload through variations in the backlash caused by temperature variation, gear tolerances, wear etc.

With such an arrangement, the correct timing of signals from the control electronics 20 to the motor 10 can be ensured, regardless of direction of rotation of the motor shaft 12.

In an alternative, not shown, there is no free gear 13 on the motor shaft 12 and instead a second free gear is installed adjacent the second gear, on the same shaft as the second gear. The second free gear has the same size and same number of teeth as the second gear 15 and it engages the teeth of the first gear 13. The teeth of the second free gear are angularly offset from the teeth of the second gear 15 by means of an elastic element (e.g. similar to elastic element 22). The angular offset is such that, when a tooth of the second gear 15 is in abutment with a given tooth of the first gear 13, a tooth of the second free gear is in abutment with the next adjacent tooth of the first gear 13, i.e. abuts the tooth immediately next to the given tooth.

Figure 6:
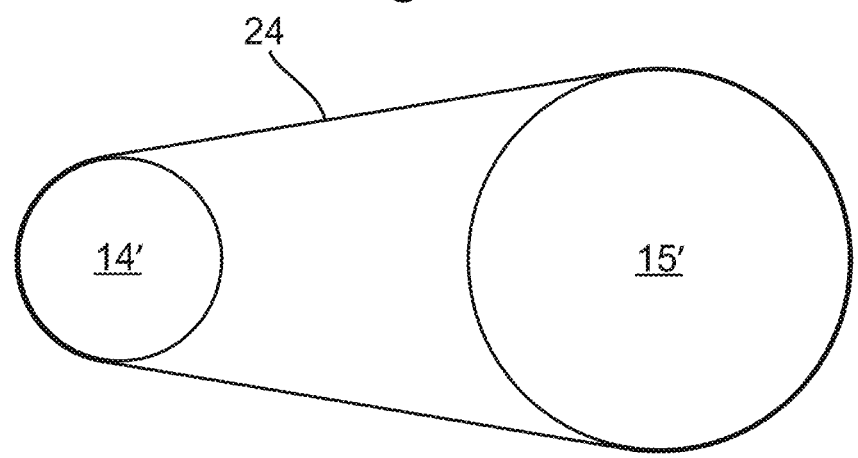
FIG. 6 shows a belt connection between the first and second wheels of a reducer arrangement.

FIG. 6 shows an alternative manner of forming the reducer arrangement. In this Figure, the first wheel 14' is a wheel having a first circumference and the second wheel 15' is a wheel having a second, different, circumference. A belt 24 connects the two wheels 14',15' together. Rotation of the first wheel 14', in either direction, is transmitted to the second wheel 15' via the timing belt 24. The second circumference is N-times larger than the first circumference. In this manner, a single full rotation of the first wheel 14' causes a 1/N rotation of the second wheel 15'. The motor system 100 described above in relation to FIGS. 1-5 may utilize the reduction gearing of FIG. 6 instead of the first gear 14 and second gear 15. In all other respects, the operation remains the same as described hereinabove.

The timing belt 24 will immediately transmit rotation of the first wheel 14' to the second wheel 15' regardless of the direction of rotation or changes in the direction of rotation.

Figure 8:
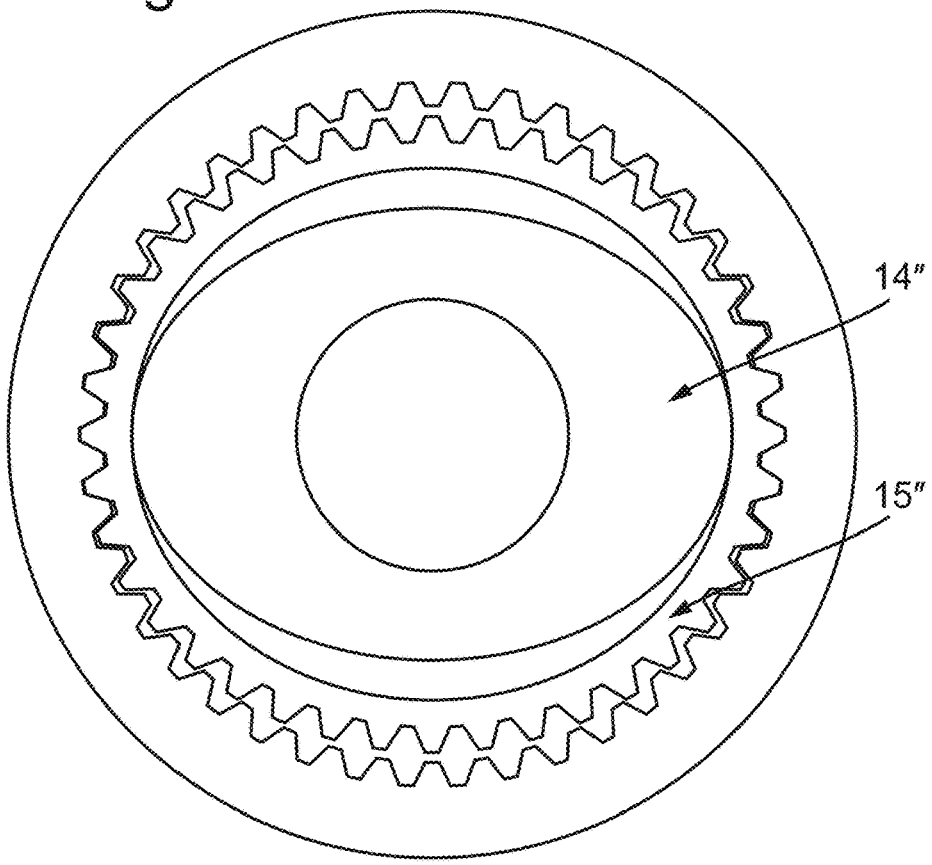
FIG. 8 shows a strain-wave gear.

In an alternative, shown in FIG. 8, the reducer or multiplier arrangement may be implemented as strain wave gearing. As known in the art, strain wave gearing includes a wave generator that is typically oval in shape that sits inside a flexible splined component ("flex spline"), and the flex spline has outward facing splines that engage an outer circular splined component that is fixed against rotation. The wave generator rotates within the flexible splined component, pushing parts of the flexible splined component radially outward to engage the splines of the outer splined component. As the wave generator rotates, the flexible splined component also rotates but at a different rotational rate from the wave generator.

When implemented in the present motor system 100 as a reducer, the wave generator 14" forms the reducer input and the flexible splined component forms the reducer output. The circular splined component is then fixed to, or formed as part of, the housing 18.

In each of the cases above, the reducer arrangement may be considered to have a reducer input, which may be either the first gear 14, the first wheel 14', or the wave generator 14". Similarly, the reducer arrangement may be considered to have a reducer output, which may be, respectively, the second gear 15, the second wheel 15', or the flexible splined component 15". In all examples, a single full rotation of the reducer input results in a 1/N rotation of the reducer output, where N is an integer greater than one.

The above description has covered the case where the control electronics 20 were originally configured to control a motor having greater number of poles (N-times greater) than the motor 10 to which the control electronics are now attached.

In an alternative arrangement, the control electronics 20 were originally configured to control a motor having N-times fewer poles than the motor 10 to which the control electronics 20 are now attached. In this alternative, a multiplier arrangement is provided instead of the reducer arrangement. The multiplier arrangement is configured to produce M full turns of a multiplier output for each full rotation of a multiplier input, where M is an integer greater than one. The multiplier input is connected for rotation with the motor shaft. In these examples, the control electronics 20 has been originally configured to control a motor having p/M rotor poles, where p is an integer multiple of M. In all other respects, the motor system having a multiplier arrangement may function in the same manner as described hereinabove.

That is, by way of example, control electronics 20 that have been originally configured to control a 10-pole motor are connected to a 20-pole motor. The multiplier arrangement is arranged such that a single rotation of the motor shaft 12 results in two (2) rotations of the multiplier output. That is, in this example, M=2.

Figure 7:
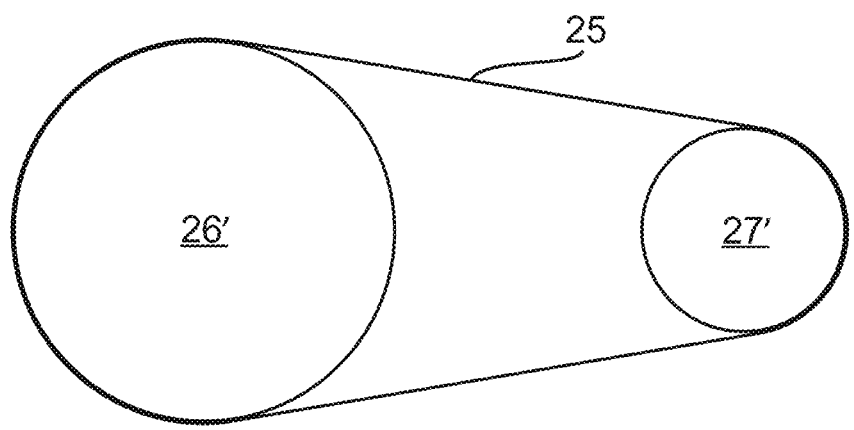
FIG. 7 shows a belt connection between first and second wheels of a multiplier arrangement.

As described above, the multiplier arrangement may be provided in a variety of different forms. In one example, the multiplier arrangement is simply two meshed gears where one gear, having a larger number of teeth is connected to the motor shaft while a second of the gears, having a smaller number of teeth, is connected to the position sensor 16. The gear with more teeth has M times more teeth than the gear having fewer teeth. This arrangement may be achieved, for example, simply by swapping around the gears 14 and 15 shown in FIG. 1. In an alternative, shown in FIG. 7, the motor shaft of the motor is connected to a first wheel 26 having a first circumference, where rotation of the motor shaft causes rotation of the wheel. A timing belt 25 connects the first wheel 26 to a second wheel 27 having a second, smaller circumference. The circumference of the first wheel 26 is M-times larger than the circumference of the second wheel 27, where M is an integer greater than one. In this manner, a single full rotation of the first wheel 26 is transmitted to the second gear 27 via the timing belt, and results in M full rotations of the second wheel 27. The position sensor 16 monitors the angular position of the second wheel 27 in the same way as described herein above for e.g. the second gear 15 of FIGS. 1, 2B, 3, and 4.

Figure 9:
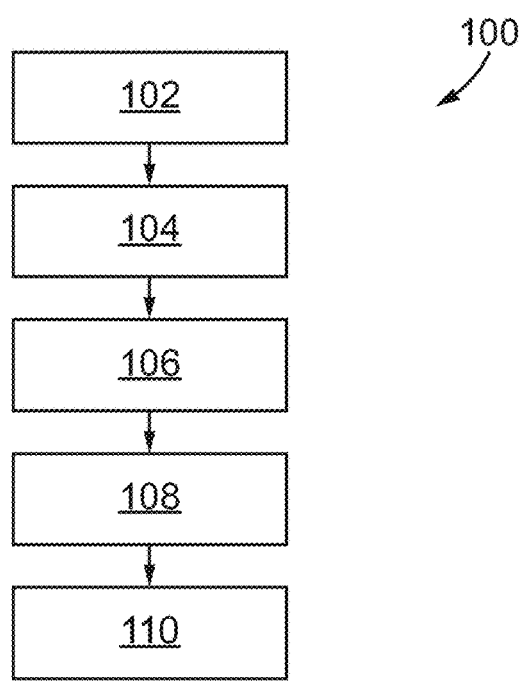
FIG. 9 shows a flow chart of a method of controlling a brushless motor.

FIG. 9 shows a flowchart of a method 100. The method includes the steps of:
- providing (102) a brushless motor 10 and either a multiplier arrangement or a reducer arrangement;
- connecting (104) control electronics (20) to the motor, where the control electronics are configured to control a motor having a different number of poles from the motor 10;
- detecting (106) an angular position of the multiplier output or reducer output, as appropriate, using a position sensor (16);
- providing (108) the detected position to the control electronics (20); and
- controlling (110) the motor (10) using the control electronics based on the detected angular position.

Figure 10A:
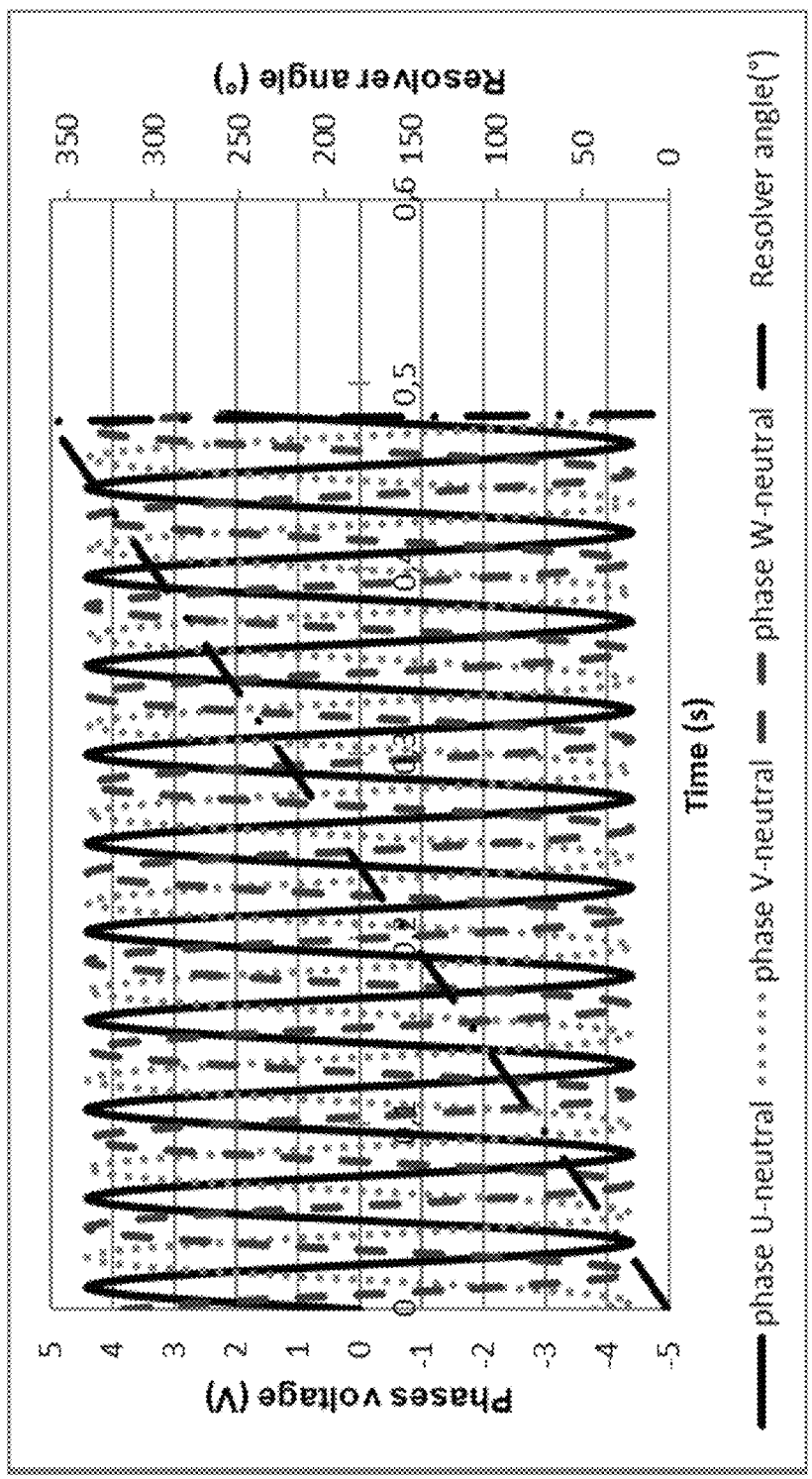
FIGS. 10A-D show various graphs depicting the voltages supplied by control electronics to motors and the angular position information received by the control electronics.

By way of explanatory example, FIG. 10A shows a graph of the voltages supplied by first control electronics that are configured to control 10-pole motor and that are connected to a 10-pole motor. The left-hand vertical axis shows the voltages of the U-V-W phases provided to the 10-pole motor as three sine waves. The right-hand vertical axis depicts the output of a position sensor (a resolver in this example). This arrangement has no reducer or multiplier arrangement and so the resolver angle shown on the graph is equal to the mechanical angle of the motor shaft. Each phase of the supplied voltage undergoes ten full cycles for a single full rotation of the motor shaft. In this example, the mechanical angle of the motor shaft is provided to the control electronics, by the position sensor, and this allows proper timing of the U-V-W phases supplied by the control electronics.

Figure 10B:
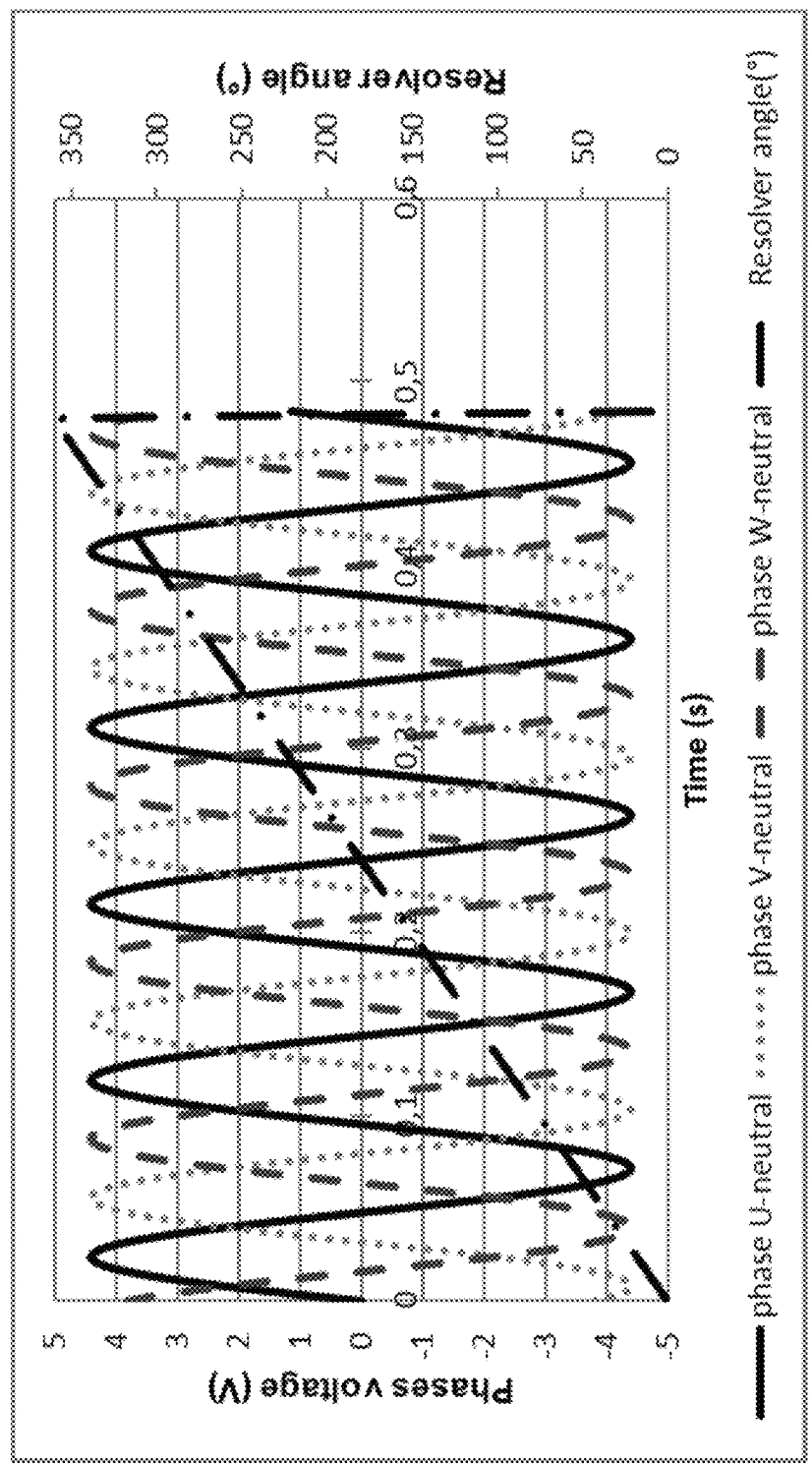

FIG. 10B shows a graph of the voltages supplied by second control electronics that are configured to control a 5-pole motor and that are connected to a 5-pole motor. Again, the left-hand vertical axis shows the U-V-W phase voltages and the right-hand vertical axis shows the output of a position sensor (resolver). This arrangement has no reducer or multiplier arrangement and so, again, the resolver angle measured by the position sensor is equal to the mechanical angle of the motor shaft. The position sensor supplies angular information to the control electronics. Each phase of the supplied voltage undergoes five full cycles for a single full rotation of the motor shaft.

Figure 10C:
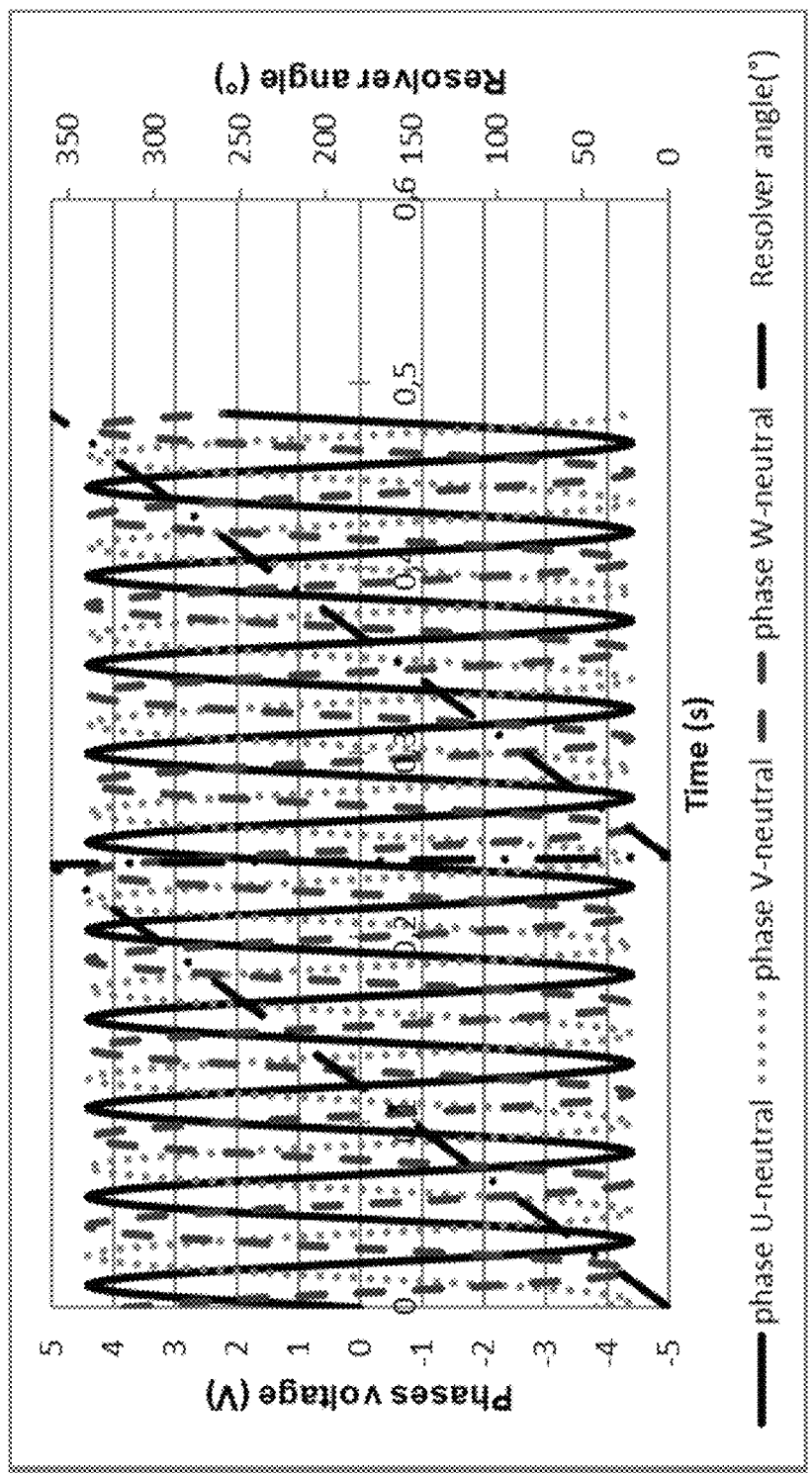

FIG. 10C shows the second control electronics but now connected to a 10-pole motor instead, and without any multiplier or reducer arrangement between the motor shaft and the position sensor. In this example, the 10-pole motor cannot be properly controlled because there are only five cycles provided to the motor for a full rotation of the motor shaft. That is, the second control electronics are outputting the U-V-W voltages to the 10-pole motor, but ten full cycles of the U-V-W phases are only supplied to the motor every two full rotations of the motor shaft, which is being directly measured by the position sensor.

Figure 10D:
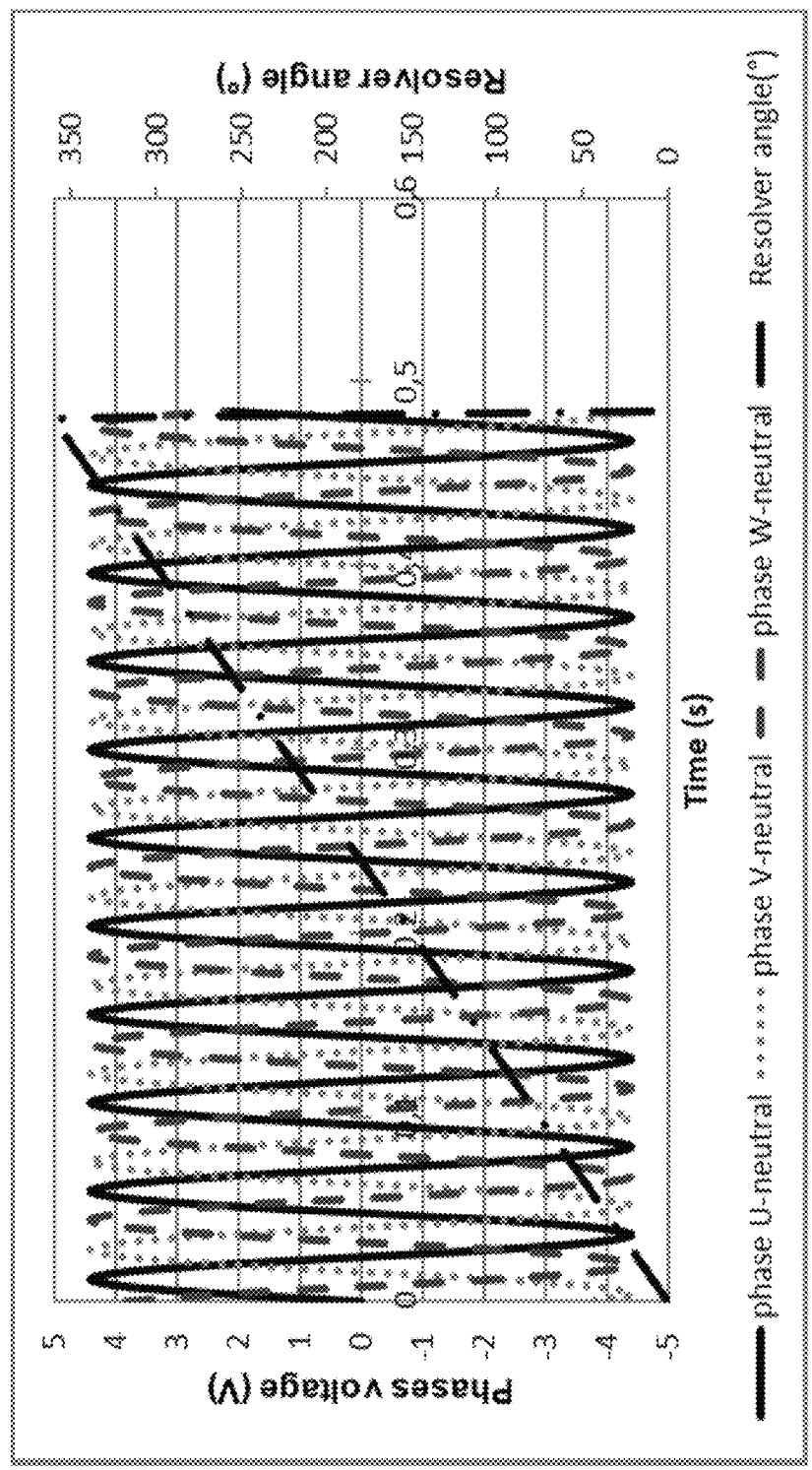

FIG. 10D shows the second control electronics connected to a 10-pole motor with the addition of a reducer between the motor shaft and the position sensor. The reducer arrangement in this example is configured to reduce by a factor of two (2), such that two full rotations of the motor shaft are detected by the position sensor as only a single full rotation. This detected position signal (i.e. detection of only one rotation, when two rotations of the motor shaft have in fact occurred) is provided to the second control electronics and the control electronics, working according to its original configuration, outputs U-W-V voltages based on the detected position signal. This conversion due to the reducer means that the second control electronics will output 10 cycles of each phase (U-V-W) for each single rotation of the motor shaft of the 10-pole motor. This allows the second control electronics to properly control the 10-pole motor, despite the second control electronics being originally configured to control a 5-pole motor. The second control electronics are still operating in their originally-configured manner, i.e. by timing of the output U-V-W voltages based on the signal received from a position sensor. That is, the second control electronics does not need to be modified in any way and may properly control the 10-pole motor of this example. The skilled reader will appreciate that graphs 10A (i.e. a 10-pole motor connected to the first control electronics configured for 10-poles) and 10C (i.e. a 10-pole motor, a reducer, and the second control electronics configured for 5-poles) are identical graphs.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:
1. A motor system comprising:
   a brushless motor comprising:
      a stator;
      a rotor having a first number, p, of rotor poles;
      a motor shaft connected to the rotor; and
      a reducer arrangement comprising:
         a reducer input connected for rotation with the motor shaft; and
         a reducer output connected to the reducer input and arranged such that a single full rotation of the reducer input causes a 1/N rotation of the reducer output, where N is an integer greater than one;
the motor system further comprising:
control electronics; and
a position sensor configured to detect an angular position of the reducer output and to provide the detected angular position to the control electronics;
wherein the control electronics is connected to the motor and is arranged to control the motor based on the detected angular position, wherein the control electronics is configured for controlling a motor having p×N rotor poles.

2. The motor system according claim 1, wherein reducer input is a first gear having a first number of gear teeth, and wherein the reducer output is a second gear having a second, different, number of gear teeth; wherein the second number of gear teeth is N-times the first number of gear teeth.

3. The motor system according to claim 2, wherein the reducer arrangement further comprises a free gear mounted axially-adjacent to and coaxial with one of the first gear and the second gear, and wherein the free gear engages the other of the first gear and the second gear; wherein an elastic element is provided to bias the free gear such that teeth of the free gear are angularly offset from teeth of its axially-adjacent gear.

4. The motor system according to claim 1, wherein the reducer arrangement is a strain wave gear system, wherein reducer input is a wave generator of the strain wave gear system and wherein the reducer output is a flex spline of the strain wave gear system.

5. The motor system according to claim 1, wherein the reducer arrangement comprises a first wheel, a second wheel, and a timing belt looping around both the first wheel and the second wheel;
wherein the reducer input the first wheel, and wherein the reducer output is the second wheel;
wherein the first wheel has a first circumference, wherein the second wheel has a second, different circumference; and
wherein the second circumference is N-times larger than the first circumference.

6. A motor system comprising:
a brushless motor comprising:
a stator; and
a rotor having a first number, p, of rotor poles;
a motor shaft connected to the rotor;
a multiplier arrangement comprising:
a multiplier input connected for rotation with the motor shaft; and
a multiplier output connected to the multiplier input and arranged such that a single full rotation of the multiplier input causes M full rotations of the multiplier output, where M is an integer greater than one;
the motor system further comprising:
control electronics; and
a position sensor configured to detect an angular position of the multiplier output and to provide the detected angular position to the control electronics;
wherein the control electronics is connected to the motor and is arranged to control the motor based on the detected angular position, wherein the control electronics is configured for controlling a motor having p/M rotor poles, wherein p is an integer multiple of M.

7. The motor system according to claim 6, wherein multiplier input is a first gear having a first number of gear teeth, and wherein the multiplier output is a second gear having a second, different, number of gear teeth; wherein the first number of gear teeth is N-times the second number of gear teeth.

8. The motor system according to claim 7, wherein the multiplier arrangement further comprises a free gear mounted axially-adjacent to and coaxial with one of the first gear and the second gear, and wherein the free gear engages the other of the first gear and the second gear; wherein an elastic element is provided to bias the free gear such that teeth of the free gear are angularly offset from teeth of its axially-adjacent gear.

9. The motor system according to claim 6, wherein the multiplier arrangement comprises a first wheel, a second wheel, and a timing belt looping around both the first wheel and the second wheel;
wherein the multiplier input is the first wheel, and wherein the multiplier output is the second wheel;
wherein the first wheel has a first circumference, wherein the second wheel has a second, different circumference; and
wherein the first circumference is N-times larger than the second circumference.

10. The motor system according to claim 6, wherein the multiplier arrangement is a strain wave gear system, wherein multiplier output is a wave generator of the strain wave gear system and wherein the multiplier input is a flex spline of the strain wave gear system.

11. The motor system according to claim 6, wherein the position sensor is one of: a resolver, a Hall effect sensor, a potentiometer, optical encoder, encoder, or an inductive sensor.

12. A method of controlling a brushless motor, the method comprising:
providing a brushless motor comprising:
a stator;
a rotor having a first number, p, of rotor poles; and
a motor shaft connected to the rotor; and
a reducer arrangement having a reducer input and a reducer output, wherein the reducer input is connected for rotation with the motor shaft, wherein the reducer output is connected to the reducer input and arranged such that a single full rotation of the reducer input causes a 1/N rotation of the reducer output, where N is an integer greater than one;
connecting control electronics to the motor, wherein the control electronics are configured to control a motor having N×p rotor poles;
detecting, using a position sensor, an angular position of the reducer output;
providing the detected angular position to the control electronics; and
controlling the brushless motor using the control electronics based on the detected angular position.

13. The method of claim 12, wherein the reducer input is a first gear having a first number of gear teeth, and wherein the reducer output is a second gear having a second, different, number of gear teeth; wherein the second number of gear teeth is N-times the first number of gear teeth; and the method further comprising:
mounting a free gear axially-adjacent to and coaxial with one of the first gear and the second gear, such that the free gear engages the other of the first gear and the second gear; and
providing an elastic element to bias the free gear such that teeth of the free gear are angularly offset from teeth of its axially-adjacent gear.

14. A method of controlling a brushless motor, the method comprising:
- providing a brushless motor comprising:
  - a stator;
  - a rotor having a first number, p, of rotor poles; and
  - a motor shaft connected to the rotor; and
  - a multiplier arrangement having a multiplier input and a multiplier output, wherein the multiplier input is connected for rotation with the motor shaft, wherein the multiplier output is connected to the multiplier input and arranged such that a single full rotation of the multiplier input causes M full rotations of the multiplier output, where M is an integer greater than one;
- connecting control electronics to the motor, wherein the control electronics are configured to control a motor having p/M rotor poles, where p is an integer multiple of M;
- detecting, using a position sensor, an angular position of the reducer output;
- providing the detected angular position to the control electronics; and
- controlling the brushless motor using the control electronics based on the detected angular position.

15. The method of claim 14 wherein the multiplier input comprises a first gear having a first number of gear teeth, and the multiplier output comprises is a second gear having a second, different, number of gear teeth; wherein the first number of gear teeth is N-times the second number of gear teeth, the method further comprising: mounting a free gear axially-adjacent to and coaxial with one of the first gear and the second gear, such that the free gear engages the other of the first gear and the second gear; and providing an elastic element to bias the free gear such that teeth of the free gear are angularly offset from teeth of its axially-adjacent gear.

* * * * *